United States Patent

Higuchi et al.

[11] Patent Number: 5,983,367
[45] Date of Patent: Nov. 9, 1999

[54] MICROPROCESSOR HAVING A CPU AND AT LEAST TWO MEMORY CELL ARRAYS ON THE SAME SEMICONDUCTOR CHIP, INCLUDING A SHARED SENSE AMPLIFIER

[75] Inventors: Takashi Higuchi; Naoto Okumura; Hideo Tsubota, all of Tokyo, Japan

[73] Assignee: Mitsubishi Denki Kabushiki Kaisha, Chiyoda-ku, Japan

[21] Appl. No.: 08/848,168

[22] Filed: Apr. 29, 1997

[30] Foreign Application Priority Data

Oct. 29, 1996 [JP] Japan ................................. 8-286604

[51] Int. Cl.[6] .......................... G06F 11/00; G06F 9/455; G11C 16/06; G11C 8/00
[52] U.S. Cl. .......................... 714/42; 714/28; 395/527; 365/185.25; 365/222; 365/230.03; 711/106
[58] Field of Search ..................... 395/183.18, 183.04, 395/527; 711/173, 106; 365/230.03, 185.25, 222

[56] References Cited

U.S. PATENT DOCUMENTS

| | | | |
|---|---|---|---|
| 5,123,107 | 6/1992 | Mensch, Jr. ............................. | 395/800 |
| 5,291,425 | 3/1994 | Nagaishi . | |
| 5,592,652 | 1/1997 | Hongo et al. ....................... | 395/497.01 |
| 5,623,673 | 4/1997 | Gephardt et al. ...................... | 395/733 |
| 5,640,542 | 6/1997 | Whitsel et al. ......................... | 395/500 |
| 5,682,310 | 10/1997 | Pedneau et al. ........................ | 364/280 |
| 5,805,522 | 9/1998 | Sukegawa et al. ................. | 365/230.03 |
| 5,822,238 | 10/1998 | Okubo ................................. | 365/230.03 |
| 5,872,737 | 2/1999 | Tsuruda et al. ..................... | 365/189.05 |
| 5,877,780 | 3/1999 | Lu et al. ................................. | 345/519 |

FOREIGN PATENT DOCUMENTS 59-47658   3/1984   Japan .
4-304532   10/1992  Japan .

OTHER PUBLICATIONS

Stanley Burns and Paul Bond, Principles of Electronic Circuits: 2nd Edition, p. 751, 1997.

*Primary Examiner*—Robert W. Beausoliel, Jr.
*Assistant Examiner*—Brian H. Shaw
*Attorney, Agent, or Firm*—Burns, Doane, Swecker & Mathis, LLP

[57] ABSTRACT

A CPU can selectively execute a normal processing mode and a debugging mode on the basis of a control signal sent from a control unit. A first memory cell array is accessed in the normal processing mode, and a second memory cell array is accessed in the debugging mode. A sense amplifier and a bit line are shared by the first and second memory cell arrays. Consequently, it is possible to relieve an increase in the area of the semiconductor chip caused by existence of the two memory cell arrays. That is, an area of a semiconductor chip is reduced. A spare memory cell array may be provided for compensating for a defective cell of the first memory cell array. A refresh circuit may be provided for refreshing the first and second memory cell arrays.

7 Claims, 11 Drawing Sheets

TO ROW DECODER 46

MICROPROCESSOR HAVING A CPU AND AT LEAST TWO MEMORY CELL ARRAYS ON THE SAME SEMICONDUCTOR CHIP, INCLUDING A SHARED SENSE AMPLIFIER

BACKGROUND OF THE INVENTION

1. Field of the Invention

The present invention relates to a microprocessor which can be incorporated in an ICE (in-circuit emulator) for use, and more particularly to improvement to reduce a size of the device having a memory for normal operation and a memory for debugging provided therein.

2. Description of the Background Art

It is said that an enhancement in efficiency of development of software is an important problem in a system using a microprocessor. For this purpose, a technique for performing debugging by using an ICE has been known well. In the conventional ICE, a memory for debugging (a so-called "trace memory") and a ROM for a monitor program (a program for executing a trace and the like) are provided on an outside of a microprocessor, and these circuits are mounted on a circuit board of the ICE. For this reason, there has been a problem that mounting cost of the ICE is high.

In order to improve this problem, it has been proposed that the memory for debugging is built in the microprocessor. FIG. 14 is a block diagram showing an example. As shown in FIG. 14, a microprocessor 150 is connected to a host system 161 and a control unit 162 so that an ICE 160 can be formed. The microprocessor 150 is built as an integrated circuit in a single semiconductor chip.

The microprocessor 150 comprises a CPU (central processing unit) 151. The CPU 151 operates on the basis of a control signal sent from the control unit 162 through a control signal line 165. A data signal is received and sent through a data signal line 154, a buffer 153 and a data signal line 164 between the CPU 151 and the control unit 162. The control unit 162 exchanges a control signal together with the host system 161 through a signal line 163.

The microprocessor 150 further comprises a memory 152 for debugging. The memory 152 is formed as a SRAM, and is addressed by an address signal sent from the CPU 151 through a signal line 155.

In the conventional microprocessor 150, however, a trace memory is formed by the SRAM. For this reason, there has been a problem that an occupied area of the memory of the microprocessor 150 on the semiconductor chip is great and cost of the semiconductor chip is high.

SUMMARY OF THE INVENTION

The present invention relates to a microprocessor comprising, in a same semiconductor chip, a CPU and a semiconductor memory which can be accessed by the CPU.

A first aspect of the present invention is directed to a microprocessor, wherein the CPU can selectively execute a normal processing mode and a debugging mode on the basis of a control signal sent from an outside, the semiconductor memory includes a first memory cell array capable of being accessed when the CPU executes the normal processing mode, and a second memory cell array capable of being accessed when the CPU executes the debugging mode, and a sense amplifier is shared by the first and second memory cell arrays.

A second aspect of the present invention is directed to the microprocessor according to the first aspect of the present invention, wherein a bit line is also shared by the first and second memory cell arrays in addition to the sense amplifier.

A third aspect of the present invention is directed to the microprocessor according to the first aspect of the present invention, wherein the sense amplifier is a shared sense amplifier, and the first and second memory cell arrays are connected to both sides of the shared sense amplifier respectively such that a bit line is divided by the shared sense amplifier between the first and second memory cell arrays.

A fourth aspect of the present invention is directed to the microprocessor according to any of the first to third aspects of the present invention, wherein the semiconductor memory further includes a third memory cell array as a spare memory cell array for compensating for a defective cell of the first memory cell array, and the first to third memory cell arrays to be accessed are selected by a first control signal for selecting the first memory cell array to be accessed and a second control signal for selecting the second or third memory cell array to be accessed.

A fifth aspect of the present invention is directed to the microprocessor according to any of the first to third aspects of the present invention, wherein the semiconductor memory is a DRAM, the microprocessor further comprising a refresh circuit for refreshing the first and second memory cell arrays, and the refresh circuit including a counter and a control circuit for controlling the counter.

The counter can generate, as a count value, an address continued over the first and second memory cell arrays and can return the count value to an initial value in response to a reset signal, and the control circuit sends the reset signal to the counter if the count value reaches a final address of the first memory cell array when the CPU executes the normal processing mode.

A sixth aspect of the present invention is directed to the microprocessor according to any of the first to third aspects of the present invention, wherein the CPU can selectively execute an operation mode capable of accessing an external memory provided on an outside of the microprocessor and an operation mode capable of accessing only the semiconductor memory.

In addition, the microprocessor further comprises an area control circuit for controlling the first and second memory cell arrays so that the first memory cell array is accessed in place of the second memory cell array on the basis of a control signal sent from the CPU when the CPU executes the operation mode capable of accessing the external memory and the debugging mode.

A seventh aspect of the present invention is directed to the microprocessor according to any of the first to fourth and sixth aspects of the present invention, wherein the semiconductor memory is a DRAM.

According to the first aspect of the present invention, the sense amplifier is shared by the first and second memory cell arrays. Consequently, it is possible to relieve an increase in an area of a semiconductor chip caused by existence of both the first and second memory cell arrays.

According to the second aspect of the present invention, the bit line is also shared by the first and second memory cell arrays in addition to the sense amplifier. Consequently, it is possible to simplify a structure and further relieve the increase in the area of the semiconductor chip.

According to the third aspect of the present invention, the shared sense amplifier is shared by the first and second memory cell arrays. Consequently, a shared sense amplifier having the same layout pattern can be provided in the first memory cell array so that a layout pattern can be generated easily to reduce a design period and a storage capacity of the first memory cell array can be set high.

According to the fourth aspect of the present invention, although the third memory cell array which acts as a spare memory cell array is provided, only the first control signal selects whether to access the first memory cell array or not. For this reason, the row decoder of the first memory cell array can have the same structure as that of a row decoder provided in a well-known semiconductor memory having the spare memory cell array. In other words, the third memory cell array provided does not enlarge a circuit scale of the row decoder of the first memory cell.

Consequently, it is possible to relieve an increase in the area in the semiconductor chip caused by existence of the third memory cell array. At the same time, an access speed of the first memory cell array which is the lowest of the access speeds of the first to third memory cell arrays can be prevented from being lowered by the existence of the third memory cell array.

According to the fifth aspect of the present invention, the counter for refresh which generates the address continued over the first and second memory cell arrays can be reset. When the CPU executes the normal processing mode, the counter is reset by the operation of the control circuit if the count value reaches the final address of the first memory cell array. In other words, only the first memory cell array is refreshed and the second memory cell array is not refreshed in the normal processing mode.

Consequently, a refresh rate of the first memory cell array can be set equal to that of a memory cell array for normal operation in a microprocessor comprising no memory cell array for debugging. Since respective refresh addresses of the first and second memory cell arrays are generated by a single counter, the area of the semiconductor chip can be reduced.

According to the sixth aspect of the present invention, when the CPU executes the operation mode capable of accessing the external memory and the debugging mode, the first memory cell array is to be accessed in place of the second memory cell array. In other words, the first memory cell array is used for a memory cell for debugging. Consequently, it is possible to keep a great storage capacity of the first memory cell array as the memory for debugging.

According to the seventh aspect of the present invention, the semiconductor memory is the DRAM. Consequently, an area occupied by each memory cell array on the semiconductor chip can be reduced remarkably.

Accordingly, an object of the present invention is to provide a microprocessor comprising a memory for normal operation and a memory for debugging which can relieve an increase in a chip area and contribute to a reduction in a size of the device.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Embodiment>

Figure 1:
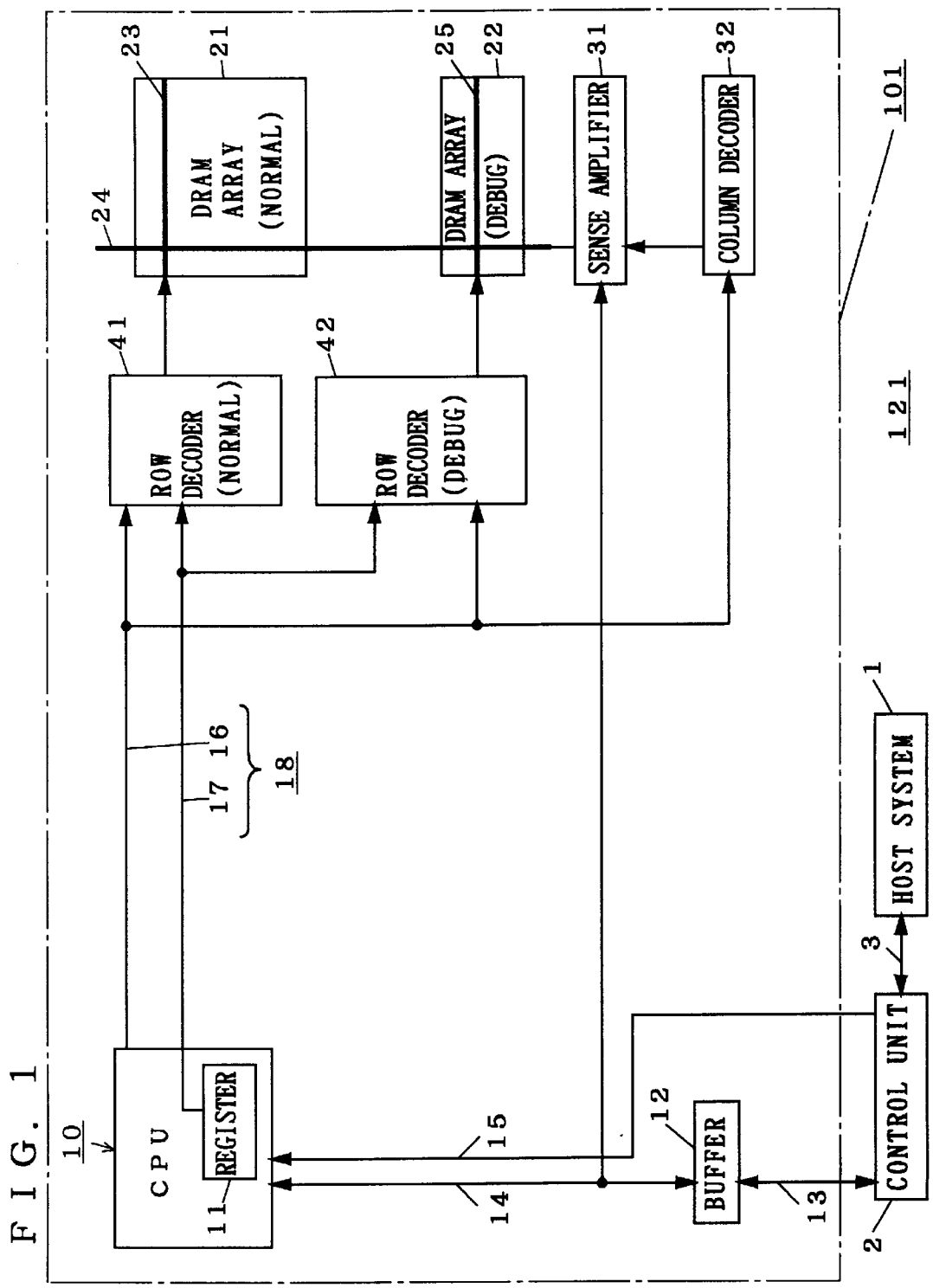
FIG. 1 is a block diagram showing an apparatus according to a first embodiment.

FIG. 1 is a block diagram showing a structure of a microprocessor according to a first embodiment. As shown in FIG. 1, a microprocessor 101 is connected to a host system 1 and a control unit 2 so that an ICE (in-circuit emulator) 121 can be formed. The microprocessor 101 is built as an integrated circuit in a single semiconductor chip. This is the same as in microprocessors 102 to 106 which will be described below.

The host system 1 is a section for controlling the whole ICE 121 based on an operator's manipulation. The control unit 2 exchanges a control signal together with the host system 1 through a signal line 3. The control unit 2 further receives and sends a data signal from and to the microprocessor 101 through a data signal line 13, and sends a control signal for controlling operation of the microprocessor 101 to the microprocessor 101 through a control signal line 15. The microprocessor 101 comprises a CPU (central processing unit) 10. The CPU 10 can selectively execute two kinds of operation modes, that is, a normal processing mode and a debugging mode on the basis of a mode selection signal which is one of the control signals sent from the control unit 2 through the control signal line 15. Furthermore, a data signal is inputted and outputted through the data signal line 13, a buffer 12 and a data signal line 14 between the CPU 10 and the control unit 2.

The microprocessor 101 further comprises two kinds of memory cell arrays 21 and 22. The memory cell array 21 is a storage medium to be accessed in the normal processing mode of the CPU 10 (a memory for normal operation). The memory cell array 22 is a storage medium to be used in the debugging mode of the CPU 10 (a memory for debugging). These are formed as memory cell arrays of a DRAM. For example, the memory cell array 21 has a storage capacity of about a megabyte, and the memory cell array 22 has a storage capacity of about a kilobyte which is much smaller than that of the memory cell array 21.

A row decoder 41 is connected to a plurality of word lines 23 of the memory cell array 21. Another row decoder 42 is connected to one or more word lines 25 of the memory cell array 22. A plurality of bit lines 24 are shared by the memory cell arrays 21 and 22. A sense amplifier 31 and a column decoder 32 are connected to these bit lines 24. In other words, the memory cell arrays 21 and 22 share the sense amplifier 31 as well as the bit lines 24.

The data signal line 14 is connected to the sense amplifier 31. The CPU 10 writes a data signal to the memory cell arrays 21 and 22, and reads the data signal therefrom through the data signal line 14 and the sense amplifier 31.

Address signals for addressing the memory cell arrays 21 and 22 are sent from the CPU 10 through an address signal line 18. The CPU 10 includes a register 11. The register 11 holds an active signal (for example, High level) or a normal signal (for example, Low level) in response to a mode selection signal when sending the address signal. In other words, the held signal is set normal when accessing a memory in the normal processing mode, and is set active when accessing the memory in the debugging mode.

An output of the register 11 forms 1 bit of the address signal as a space control signal. More specifically, the address signal is formed by a normal address signal capable of addressing the memory cell array 21 and the space control signal outputted from the register 11. Correspondingly, the address signal line 18 is formed by a normal address signal line 16 for sending the normal address signal and a space control signal line 17 for sending the space control signal.

The row decoder 41 decodes the address signal sent through the address signal line 18 to selectively drive one of the word lines 23 of the memory cell array 21 which is specified by the address signal. Similarly, the row decoder 42 decodes the address signal sent through the address signal line 18 to selectively drive one of the word lines 25 of the memory cell array 22 which is specified by the address signal.

Furthermore, the column decoder 32 decodes the address signal sent through the address signal line 18 to selectively drive one of the bit lines 24. Thus, the memory cells included in the memory cell arrays 21 and 22 which are specified by the address signals are selectively accessed.

The row decoder 41 selectively drives any of the word lines 23 (that is, performs decoding operation) when the space control signal is normal, and it does not drive any of the word lines 23 when the space control signal is active (that is, stops the decoding operation). The row decoder 42 stops the decoding operation when the space control signal is normal, and it performs the decoding operation when the space control signal is active. In other words, the row decoders 41 and 42 selectively perform the decoding operation for only one of the memory cell arrays 21 and 22 in accordance with a value of the space control signal.

As described above, the microprocessor 101 can selectively execute both operation modes, that is, the normal processing mode and the debugging mode in response to the mode selection signal sent from the control unit 2 without being connected to a memory prepared on an outside. In addition, two kinds of memory cell arrays 21 and 22 used in the respective operation modes share the bit lines 24 and the sense amplifier 31. Consequently, it is possible to relieve an increase in a chip area caused by combining the respective memory cell arrays 21 and 22.

More specifically, the increase in the chip area caused by adding the memory cell array 22 is mainly limited to an amount corresponding to the memory cell array 22 itself and the two operation modes can be implemented without an external memory. Thus, high availability and a reduction in a size of the device can be realized compatibly.

<Second Embodiment>

Figure 2:
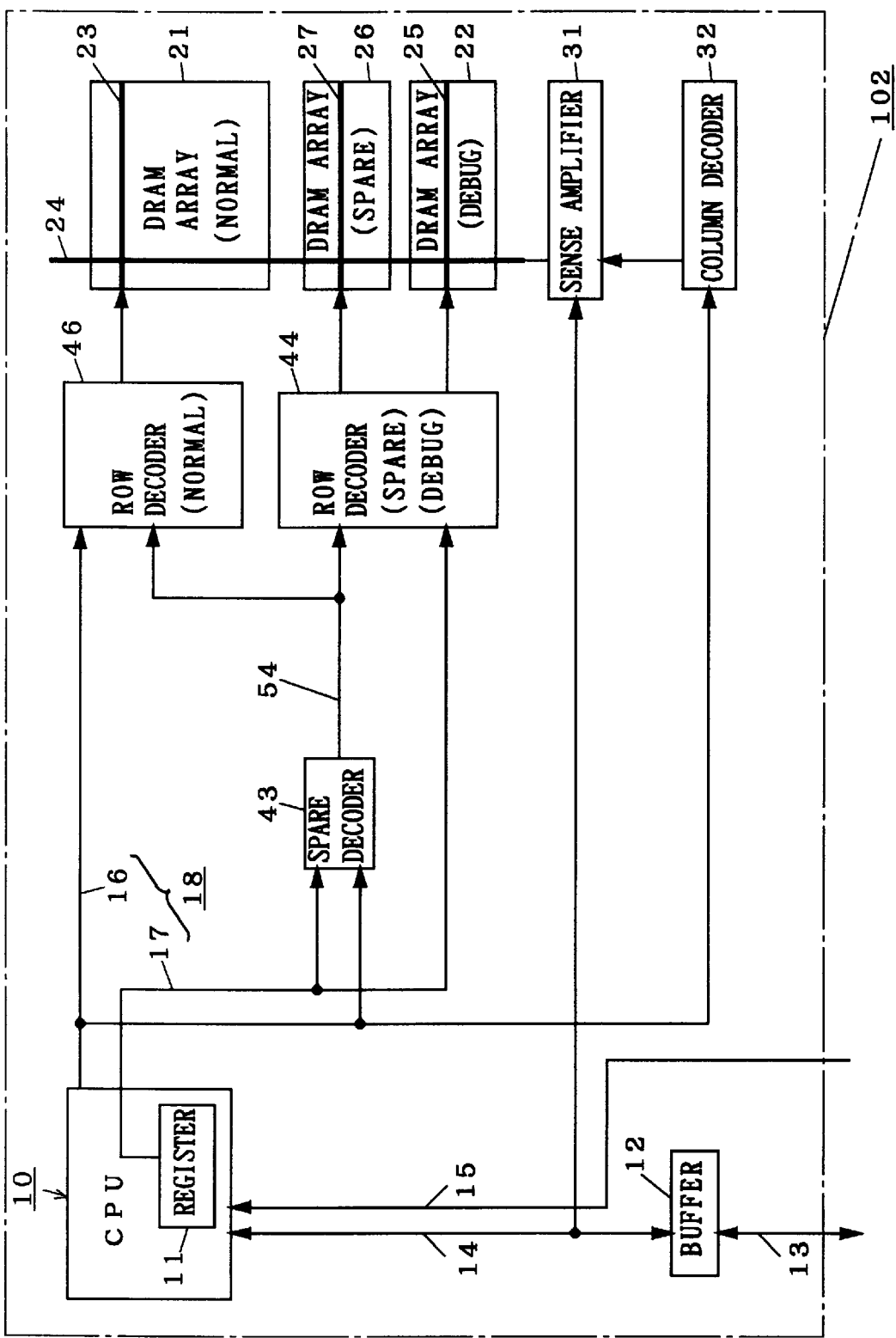
FIG. 2 is a block diagram showing an apparatus according to a second embodiment.

FIG. 2 is a block diagram showing a structure of a microprocessor according to a second embodiment. In the following drawings, the same portions as those in the device according to the first embodiment shown in FIG. 1 have the same reference numerals and their detailed description will be omitted.

A microprocessor 102 comprises a memory cell array 26 which acts as a spare memory for compensating for a defective memory cell. Similarly to memory cell arrays 21 and 22, the memory cell array 26 is also formed by a DRAM memory cell array.

A word line 23 of the memory cell array 21 is driven by a row decoder 46, and a word line 25 of the memory cell array 22 and a word line 27 of the memory cell array 26 are driven by another row decoder 44. The microprocessor 102 further comprises another spare decoder 43. The spare decoder 43 outputs a control signal to a signal line 54 on the basis of a normal address signal and a space control signal. The control signal includes a spare control signal (a first control signal).

A structure in which either a row decoder for driving a memory for normal operation corresponding to the memory cell array 21 or a row decoder for driving a spare memory corresponding to the memory cell array 26 selectively operates on the basis of a spare control signal has been known well in a DRAM including the spare memory. The row decoder 46 has the same structure as that of the row decoder for driving the memory for normal operation provided in the well-known DRAM, and selectively performs operation and stops the operation on the basis of the spare control signal sent from the spare decoder 43. In other words, although the memory cell array 22 for debugging is provided, a scale of the row decoder 46 is limited equivalently to the well-known row decoder.

When the memory for normal operation should be selected, the spare control signal is set normal. At this time, the row decoder 46 performs a decoding operation for the memory cell array 21 on the basis of a normal address signal sent through a normal address signal line 16. When the spare memory should be selected, the spare control signal is set active. At this time, the row decoder 46 stops the decoding operation irrespective of a value of the normal address signal.

Figure 3:
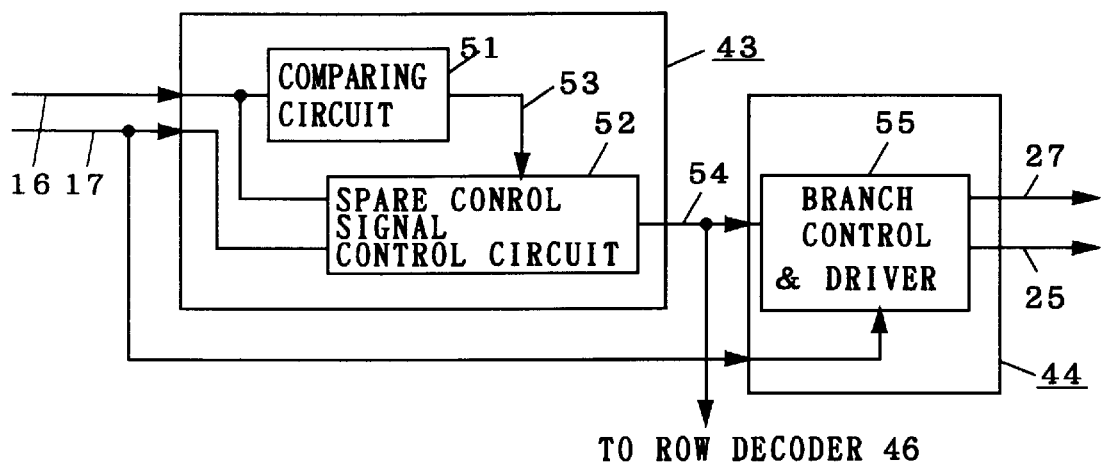
FIG. 3 is a block diagram showing a spare decoder and a row decoder in FIG. 2.

FIG. 3 is a block diagram showing internal structures of the spare decoder 43 and the row decoder 44. The spare decoder 43 includes a comparing circuit 51 and a spare control signal control circuit 52. The row decoder 44 includes a branch control circuit 55. A lot of fuses are provided in the comparing circuit 51. These fuses are selectively blown according to the result of a test of the memory cell array 21 in the process of manufacturing the microprocessor 102.

A normal address signal is inputted to the comparing circuit 51 through the normal address signal line 16. When a value of the normal address signal is coincident with specific values determined by combination of the blown fuses (the number of the specific values is generally plural), a control signal capable of selecting any of the word lines 27 of the memory cell array 26 is outputted (the number of the word lines 27 is generally plural). The control signal includes the above-mentioned spare control signal, and is inputted to the spare control signal control circuit 52 through a signal line 53.

Figure 4:
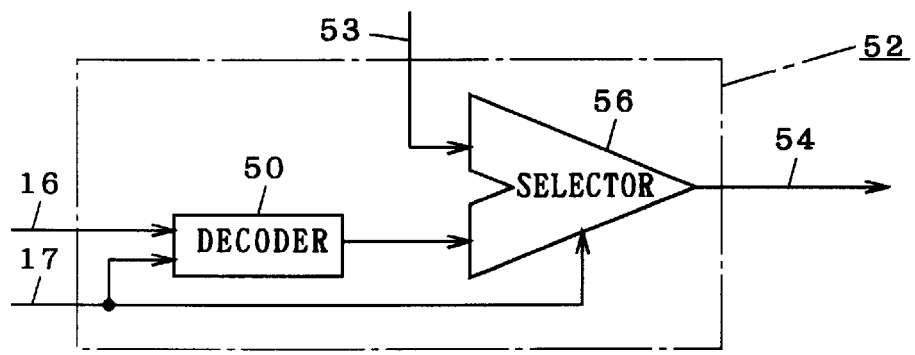
FIG. 4 is a block diagram showing a spare control signal control circuit in FIG. 3.

FIG. 4 is a block diagram showing a structure of the spare control signal control circuit 52. The spare control signal control circuit 52 includes a decoder 50 and a selector 56. The decoder 50 decodes an address signal and outputs a decoded signal. The decoded signal can selectively specify any of the word lines 25 of the memory cell array 22 used for debugging, and includes the above-mentioned spare control signal.

The selector 56 selects a control signal inputted through the signal line 53 when a space control signal inputted through a space control signal line 17 is normal. On the other hand, the selector 56 selects a control signal outputted from the decoder 50 when the same space control signal is active. Thus, the selected signals are outputted to the signal line 54.

Figure 5:
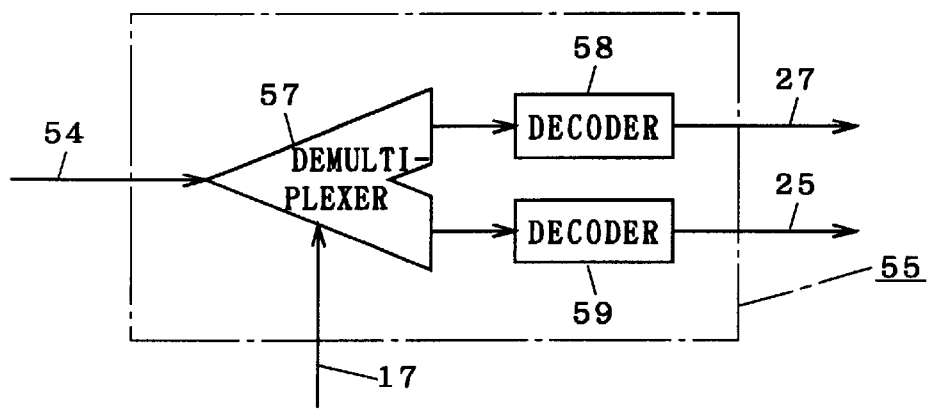
FIG. 5 is a block diagram showing a branch control circuit in FIG. 3.

FIG. 5 is a block diagram showing a structure of the branch control circuit 55. The branch control circuit 55 includes a demultiplexer 57 and decoders 58 and 59. The demultiplexer 57 sends a control signal inputted through the signal line 54 to the decoder 58 when a space control signal (a second control signal) inputted through the space control signal line 17 is normal. On the other hand, the demultiplexer 57 sends the control signal inputted through the signal line 54 to the decoder 59 when the space control signal inputted through the space control signal line 17 is active. The decoders 58 and 59 selectively drive one of the word lines 27 and one of the word lines 25 on the basis of the control signals inputted thereto, respectively.

Since the spare decoders 43 and 44 have the above-mentioned structures, they operate in the following manner. When a CPU 10 executes a normal processing mode to access a memory, the spare control signal control circuit 52 sends the control signal sent from the comparing circuit 51 to the signal line 54 because the space control signal is normal. When the normal address signal is not coincident with any of address values set in the comparing circuit 51, a control signal including a normal spare control signal is outputted from the comparing circuit 51. This control signal is sent to the row decoder 46, and is sent to the decoder 58 through the demultiplexer 57 included in the branch control circuit 55.

Since the spare control signal is normal, the row decoder 46 performs decoding operation for the memory cell array 21 on the basis of the normal address signal. Since the spare control signal is normal, the decoder 58 stops the decoding operation for the memory cell array 26. The control signal is not sent to the decoder 59. For this reason, the decoding operation for the memory cell array 22 is not performed. In other words, only the memory cell array 21 is accessed.

When the normal address signal is coincident with any of the address values set in the comparing circuit 51, a control signal including an active spare control signal is outputted from the comparing circuit 51. This control signal is sent to the row decoder 46, and is sent to the decoder 58 through the demultiplexer 57.

Since the spare control signal is active, the row decoder 46 stops the decoding operation for the memory cell array 21. Since the spare control signal is active, the decoder 58 performs the decoding operation for the memory cell array 26 on the basis of the control signal. The control signal is not sent to the decoder 59. For this reason, the decoding operation for the memory cell array 22 is not performed. In other words, only the memory cell array 26 is accessed.

When the CPU 10 executes a debugging mode to access the memory, the selector 56 sends the control signal sent from the decoder 50 to the signal line 54 because the space control signal is active. A spare control signal included in the control signal sent from the decoder 50 is set active. This control signal is sent to the row decoder 46, and is sent to the decoder 59 through the demultiplexer 57.

Since the spare control signal is active, the row decoder 46 stops the decoding operation for the memory cell array 21. On the other hand, the decoder 59 performs the decoding operation for the memory cell array 22 on the basis of the control signal. The control signal is not sent to the decoder 58. For this reason, the decoding operation for the memory cell array 26 is not performed. In other words, only the memory cell array 22 is accessed.

In the normal processing mode, either the memory cell array 21 for normal operation or the memory cell array 26 which acts as the spare memory is selectively accessed based on setting in the comparing circuit 51. In the debugging mode, only the memory cell array 22 which acts as a memory array for debugging is always accessed. In other words, three kinds of memory cell arrays 21, 22 and 26 can be accessed properly.

Although the three kinds of memory cell arrays 21, 22 and 26 are selectively accessed in the microprocessor 102, the space control signal is not inputted to the row decoder 46 but only the normal address signal and the spare control signal are inputted. The row decoder 46 decodes these inputted signals in the same manner as in a row decoder for driving a memory for normal operation according to the prior art. This results from a structure in which the control signal for the memory cell array 26 which acts as a spare memory and the control signal for the memory cell array 22 for debugging are shared in the spare decoder 43 and an active spare control signal is sent also in the debugging mode.

An address decoder provided in a DRAM normally performs stepwise decoding in which an address signal is first predecoded and the predecoded address signal is further decoded. For this reason, if the row decoder 46 inputs a space control signal in addition to a normal address signal and a spare control signal, it is necessary to add a logic gate for the predecoded signal and the space control signal which acts as a decision bit. More specifically, the number of control signals which should be stopped is increased in the row decoder 46 unlike the case where the number of address lines is merely increased for 1 bit. Consequently, a chip area is far increased. Furthermore, the number of logic gates is increased so that an operating speed is lowered.

The memory cell array 21 for normal operation has a greater storage capacity than that of the memory cell array 26 which acts as the spare memory. Accordingly, the number of decoding steps in the row decoder 46 is greater than that of the row decoder for driving the word line 27 of the memory cell array 26. For this reason, an access speed is defined by the row decoder 46 in the normal processing mode. Consequently, a reduction in the operating speed of the row decoder 46 directly brings a reduction in the access speed in the normal processing mode.

In the microprocessor 102, the control signal for the memory cell array 26 which acts as the spare memory and the control signal for the memory cell array 22 for debugging are shared so that an increase in the chip area of the row decoder 46 is relieved and a reduction in the access speed is suppressed. In other words, the microprocessor 102 can compatibly realize high availability and a reduction in a size of an apparatus in which the spare memory is provided and the two operation modes can be implemented without an external memory.

<Third Embodiment>

Figure 6:
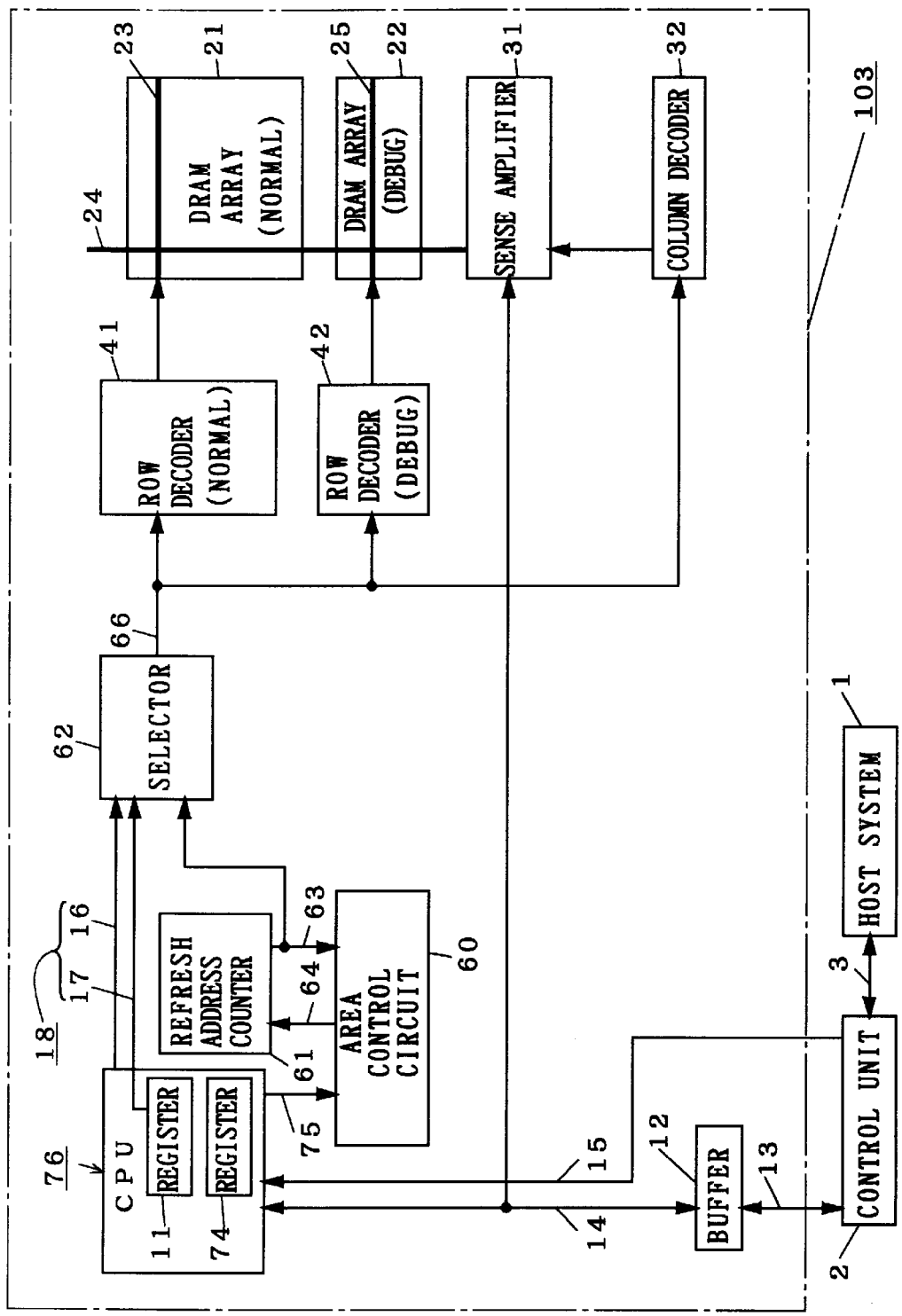
FIG. 6 is a block diagram showing an apparatus according to a third embodiment.

FIG. 6 is a block diagram showing a structure of a microprocessor according to a third embodiment. A microprocessor 103 comprises a refresh circuit for refreshing memory cells provided in memory cell arrays 21 and 22. The refresh circuit includes an area control circuit (a control circuit) 60, a refresh address counter 61 and a selector 62.

A CPU 76 includes a register (mode register) 74 in addition to the above-mentioned register 11. Whether or not the CPU 76 sends an address signal, the register 74 holds an active signal or a normal signal in response to a mode selection signal. More specifically, this signal is set normal in a normal processing mode and is set active in a debugging mode, and is inputted to the area control circuit 60 through a signal line 75.

Figure 7:
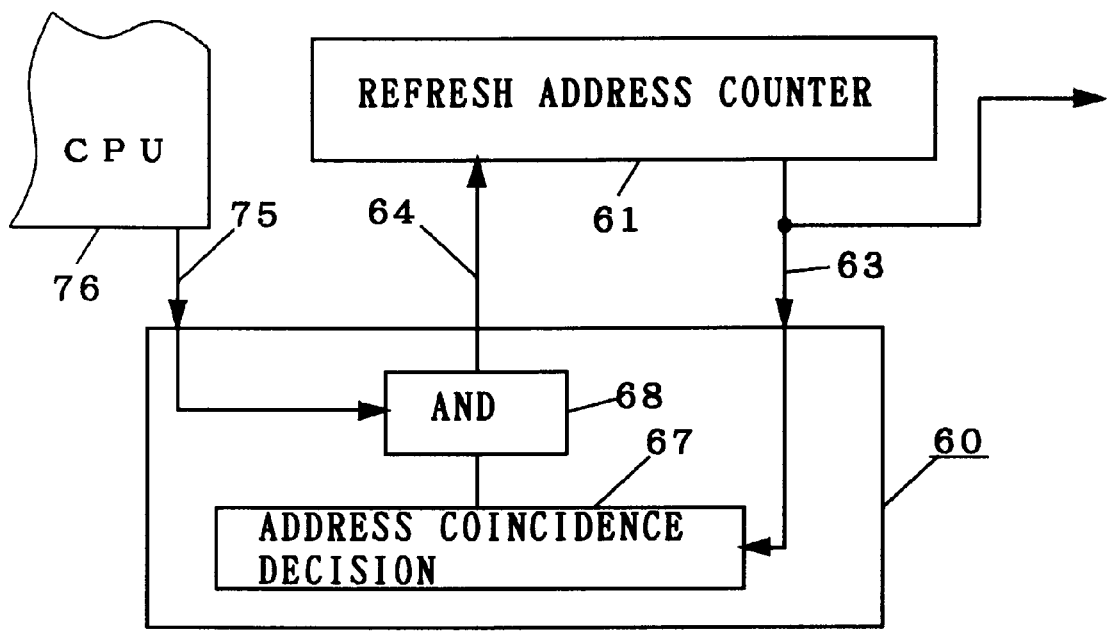
FIG. 7 is a block diagram showing an area control circuit in FIG. 6.

FIG. 7 is a block diagram showing an internal structure of the area control circuit 60 and a relationship with peripheral circuits. The area control circuit 60 includes an address coincidence deciding circuit 67 and an AND circuit 68. The refresh address counter 61 can perform counting within a range from an initial value (for example, zero) to a final value and can be reset by a reset signal inputted through a signal line 64 (a count value is returned to the initial value).

The final value is set such that the range of the count value from the initial value to the final value corresponds to all addresses of the memory cell arrays 21 and 22. The count value of the refresh address counter 61 is inputted as a refresh address to both the selector 62 and the address coincidence deciding circuit 67 through a signal line 63.

The address coincidence deciding circuit 67 compares the inputted count value with a predetermined set value, and outputs an active signal if both values are coincident with each other. The set value to be compared is preset by a logic gate element. This set value is determined such that values ranging from the initial value to the set value correspond to all the addresses of the memory cell array 21. The AND circuit 68 calculates logical AND of an output signal of the address coincidence deciding circuit 67 and a signal held by the register 74, and outputs the logical AND.

Accordingly, when the CPU 76 executes the debugging mode, that is, the register 74 holds an active signal, an active signal is sent as a reset signal from the AND circuit 68 to the refresh address counter 61 if the count value of the refresh address counter 61 is coincident with the set value of the address coincidence deciding circuit 67. As a result, the count value is returned to the initial value. More specifically, the refresh address counter 61 sequentially generates, as a count value, a value ranging from the initial value to the set value of the address coincidence deciding circuit 67, that is, an address only of the memory cell array 21.

On the other hand, when the CPU 76 executes the normal processing mode, that is, the register 74 holds a normal signal, an active signal is not outputted from the AND circuit 68 even if the count value of the refresh address counter 61 is coincident with the set value of the address coincidence deciding circuit 67. Accordingly, the refresh address counter 61 is not reset but sequentially generates, as a count value, a value ranging from the initial value to the final value, that is, an address over the memory cell arrays 21 and 22.

Returning to FIG. 6, the count value of the refresh address counter 61 is also inputted to the selector 62 through the signal line 63. The selector 62 selects and outputs either the count value inputted through the signal line 63 or the address signal inputted through an address signal line 18 depending on whether it is at a refresh timing. The output signal of the selector 62 is inputted to row decoders 41 and 42 and to a column decoder 32 through a signal line 66.

In the microprocessor 103 described above, the refresh address only of the memory cell array 21 for normal operation is generated when the CPU 76 executes the normal processing mode, that is, an operation mode without using the memory cell array 22 for debugging, and both refresh addresses are continuously generated when the CPU 76 executes the debugging mode.

When the memory cell array 22 for debugging is not used, useless operation for refreshing the memory cell array 22 is not performed. As a result, a refresh rate of the memory cell array 21 for normal operation can be set equal to that of a memory cell array for normal operation of a microprocessor comprising no memory cell array 22 for debugging.

Furthermore, the counter for generating respective refresh addresses of the memory cell arrays 21 and 22 is shared in the refresh address counter 61. Consequently, a chip area can be reduced.

<Fourth Embodiment>

Figure 8:
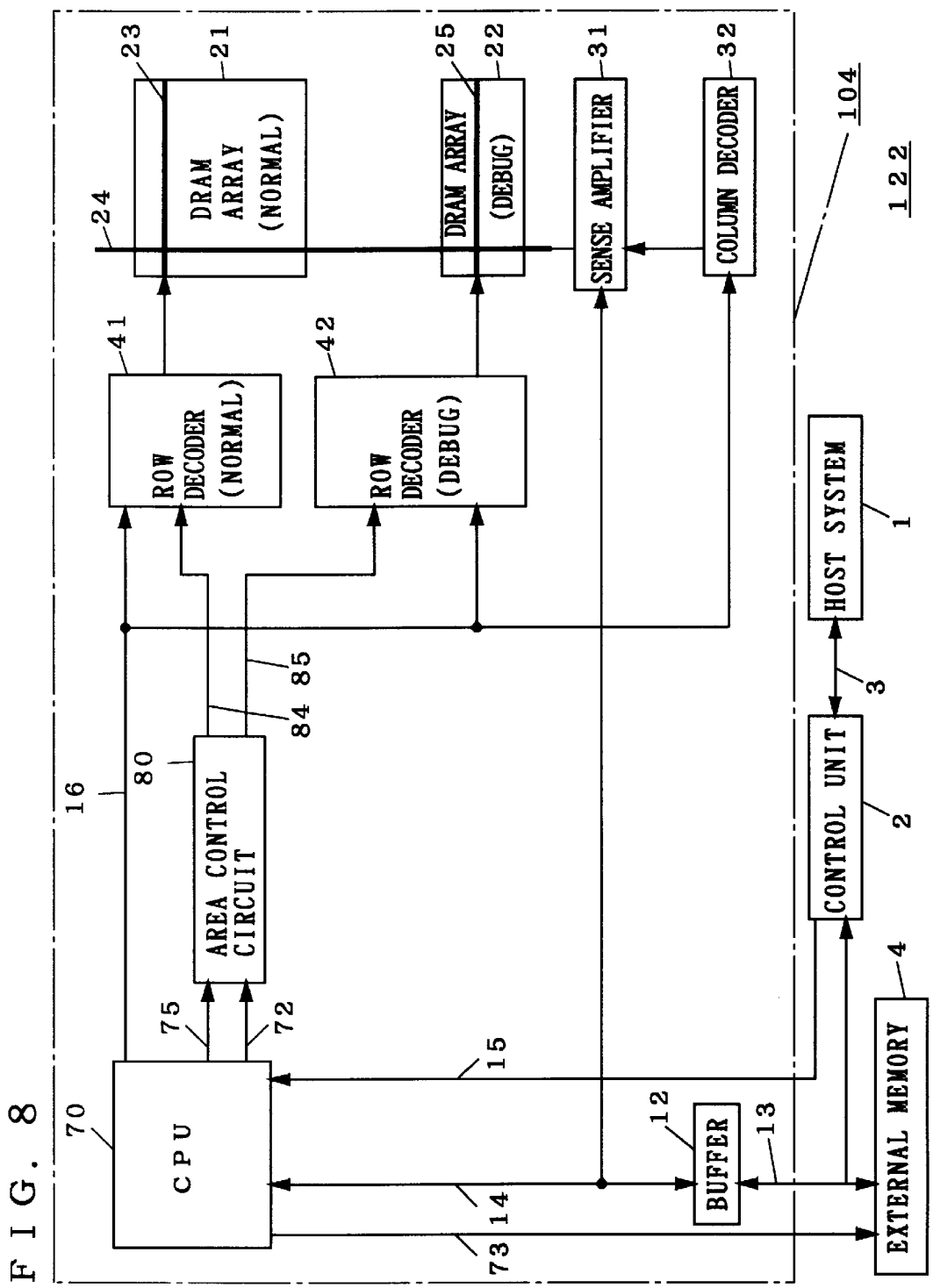
FIG. 8 is a block diagram showing an apparatus according to a fourth embodiment.

FIG. 8 is a block diagram showing a structure of a microprocessor according to a fourth embodiment. A microprocessor 104 is formed such that a program stored in an external memory 4 provided in an ICE 122 can also be executed in place of an internal memory cell array 21 for normal operation. A CPU 70 provided in the microprocessor 104 sends an address signal to the external memory 4 through a signal line 73 when accessing the external memory 4.

When using the external memory 4, the memory cell array 21 is not needed. In the microprocessor 104, the memory cell array 21 can be used for debugging when the CPU 70 executes an operation mode using the external memory 4 as a memory for normal operation. For this purpose, the microprocessor 104 comprises an area control circuit 80.

Figure 9:
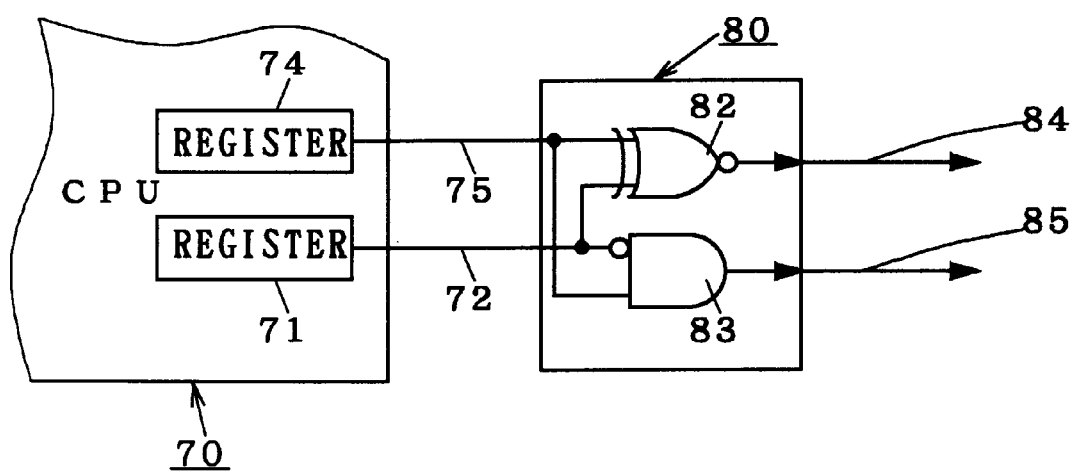
FIG. 9 is a block diagram showing an area control circuit in FIG. 8.

FIG. 9 is a block diagram showing an internal structure of the area control circuit 80. The CPU 70 includes a register 71 in addition to a register 74 for holding a signal to be set active in a debugging mode. The register 71 holds an active signal or a normal signal depending on whether the CPU 70 executes a mode using the external memory 4 or the memory cell array 21 as a memory for normal operation.

The area control circuit 80 includes two logic gate elements 82 and 83. A signal of the register 74 is inputted to respective inputs of the logic gate elements 82 and 83 through a signal line 75, and a signal of the register 71 is inputted thereto through a signal line 72.

The logic gate element 82 is an exclusive NOR circuit, and outputs an active signal only when the signals of the registers 74 and 71 are coincident with each other (both signals are active or normal). The output signal of the logic gate element 82 is inputted to a row decoder 41 through a signal line 84. The row decoder 41 performs decoding operation only when the signal of the signal line 84 is active.

The logic gate element 83 outputs an active signal only when the signal of the register 74 is active and that of the register 71 is normal. The output signal of the logic gate element 83 is inputted to a row decoder 42 through a signal line 85. The row decoder 42 performs a decoding operation only when the signal of the signal line 85 is active.

When the CPU 70 executes a normal processing mode and an operation mode using the memory cell array 21 as a memory for normal operation, the signals of the registers 74 and 71 are set normal. At this time, the logic gate element 82 outputs an active signal and the logic gate element 83 outputs a normal signal. Accordingly, the row decoder 41 performs the decoding operation for the memory cell array 21, and the row decoder 42 stops the decoding operation for the memory cell array 22. In other words, only the internal memory cell array 21 for normal operation can be accessed by the CPU 70.

When the CPU 70 executes the normal processing mode and an operation mode using the external memory 4 as the memory for normal operation, the signal of the register 74 is set normal and that of the register 71 is set active. At this time, the logic gate element 82 outputs a normal signal and the logic gate element 83 also outputs a normal signal. Accordingly, the row decoder 41 stops the decoding operation for the memory cell array 21, and the row decoder 42 also stops the decoding operation for the memory cell array 22. In other words, only the external memory 4 can be accessed as the memory for normal operation by the CPU 70.

When the CPU 70 executes the debugging mode and the operation mode using the memory cell array 21 as the memory for normal operation, the signal of the register 74 is set active and that of the register 71 is set normal. At this time, the logic gate element 82 outputs a normal signal and the logic gate element 83 outputs an active signal. Accordingly, the row decoder 41 stops the decoding operation for the memory cell array 21, and the row decoder 42 performs the decoding operation for the memory cell array 22. In other words, debugging operation using the memory cell array 22 can be performed.

When the CPU 70 executes the debugging mode and the operation mode using the external memory 4 as the memory for normal operation, the signal of the register 74 is set active and that of the register 71 is also set active. At this time, the logic gate element 82 outputs an active signal and the logic gate element 83 outputs a normal signal. Accordingly, the row decoder 41 performs the decoding operation for the memory cell array 21, and the row decoder 42 stops the decoding operation for the memory cell array 22. In other words, debugging operation using the memory cell array 21 as a memory for debugging can be performed.

When an address for accessing the memory for debugging is sent from the CPU 70 in the mode using the external memory 4, the row decoder 41 for driving the memory for normal operation operates by a control signal generated by the area control circuit 80 which is controlled by the CPU 70. In the microprocessor 104, thus, the internal memory cell array 21 for normal operation can be used for the memory for debugging in the operation mode for executing the program stored in the external memory 4. Consequently, it is possible to keep, in the memory for debugging, a great storage capacity of the memory cell array 21, for example, a storage capacity of about several megabytes.

<Fifth Embodiment>

Figure 10:
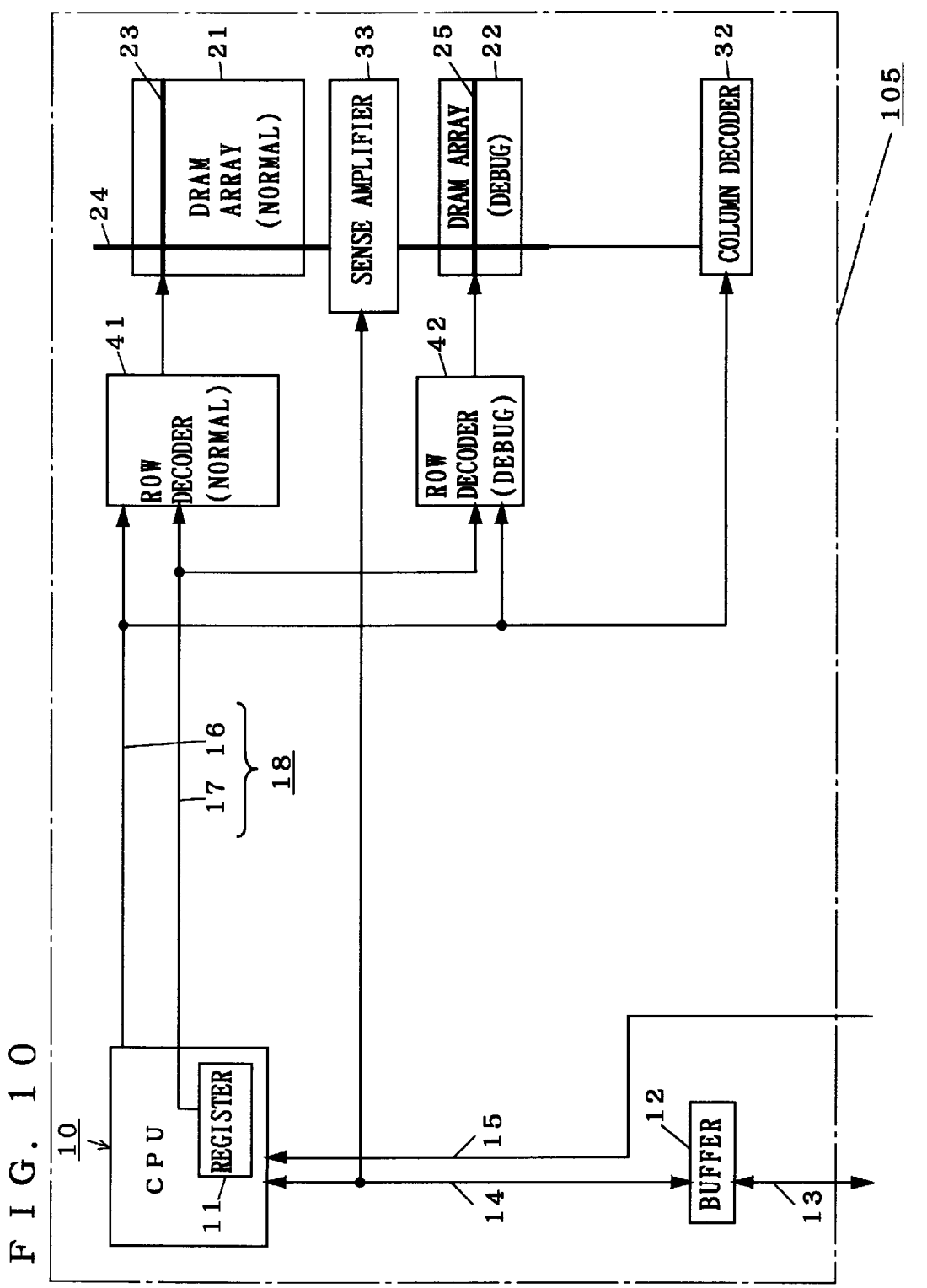
FIG. 10 is a block diagram showing an apparatus according to a fifth embodiment.

FIG. 10 is a block diagram showing a structure of a microprocessor according to a fifth embodiment. A microprocessor 105 is characteristically different from the microprocessor 101 according to the first embodiment in that a shared sense amplifier 33 is used as a sense amplifier and a memory cell array 22 for debugging is provided opposite to a memory cell array 21 with the shared sense amplifier 33 provided therebetween.

Figure 11:
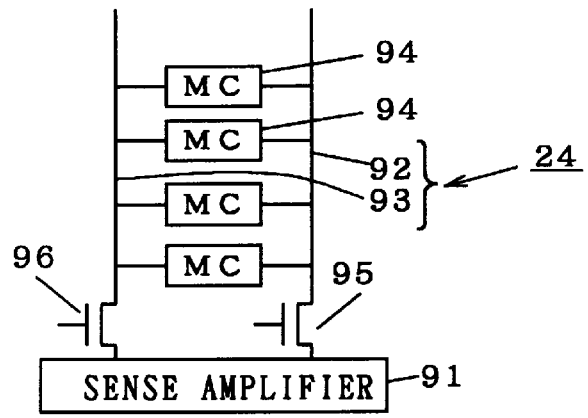
FIG. 11 is a partial circuit diagram showing a memory cell array to be compared.
Figure 12:
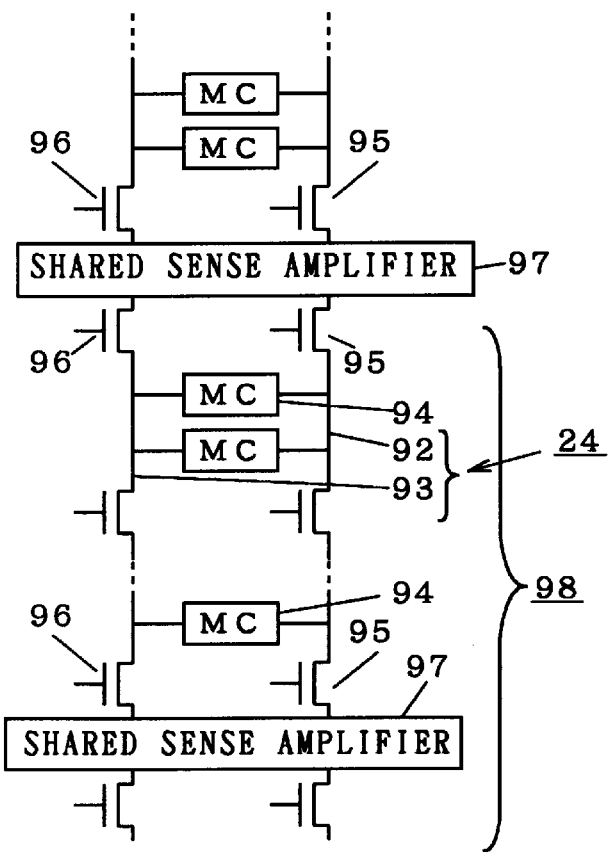
FIG. 12 is a partial circuit diagram showing a memory cell array in FIG. 10.

FIGS. 11 and 12 are circuit diagrams showing parts of memory cell arrays including two kinds of sense amplifiers, respectively. The memory cell array shown in FIG. 11 includes a sense amplifier 91 which is not a shared type, and has a structure suitable for a memory cell array having a comparatively small storage capacity. A memory cell 94 is connected between a pair of signal lines 92 and 93 forming a bit line 24. Transfer gate elements 95 and 96 are provided between the memory cell 94 and the sense amplifier 91.

The memory cell array shown in FIG. 12 includes a shared sense amplifier 97. This structure is suitable for a memory cell array in which the bit line 24 is as long and a storage capacity is as high as a burden of a signal sense amplifier is excessive. As shown in FIG. 12, the shared sense amplifier 97 is provided in a plurality of portions along the bit line 24. In other words, the memory cell array has a structure in which an interval 98 from the shared sense amplifier 97 to the next shared sense amplifier 97 provided along the bit line 24 acts as a unit and a plurality of units are repeatedly arranged. Thus, a layout pattern can be generated easily.

The transfer gate elements 95 and 96 are provided on both sides of the shared sense amplifier 97. A different layout pattern is used for the shared sense amplifier 97 provided on an end of the memory cell array so as to omit a pair of unnecessary transfer gate elements 95 and 96.

Returning to FIG. 10, the memory cell array 21 provided in the microprocessor 105 has the structure shown in FIG. 12. Accordingly, the shared sense amplifier 97 appears on one of ends of a bit line 24 of the memory cell array 21. The shared sense amplifier 97 is identical to the shared sense amplifier 33 shown in FIG. 10. In other words, the shared sense amplifier 33 is shared by two kinds of memory cell arrays 21 and 22. In addition, it is possible to form the shared sense amplifier 33 with the same layout pattern as in other shared sense amplifiers 97 of the memory cell array 21.

In the microprocessor 105, consequently, it is possible to relieve an increase in a chip area caused by existence of the memory cell array 22, and the layout pattern can be generated easily and a design period can be reduced.

<Sixth Embodiment>

The microprocessors 101 to 105 according to the first to fifth embodiments described above can be optionally combined for execution. One of examples will be described below.

Figure 13:
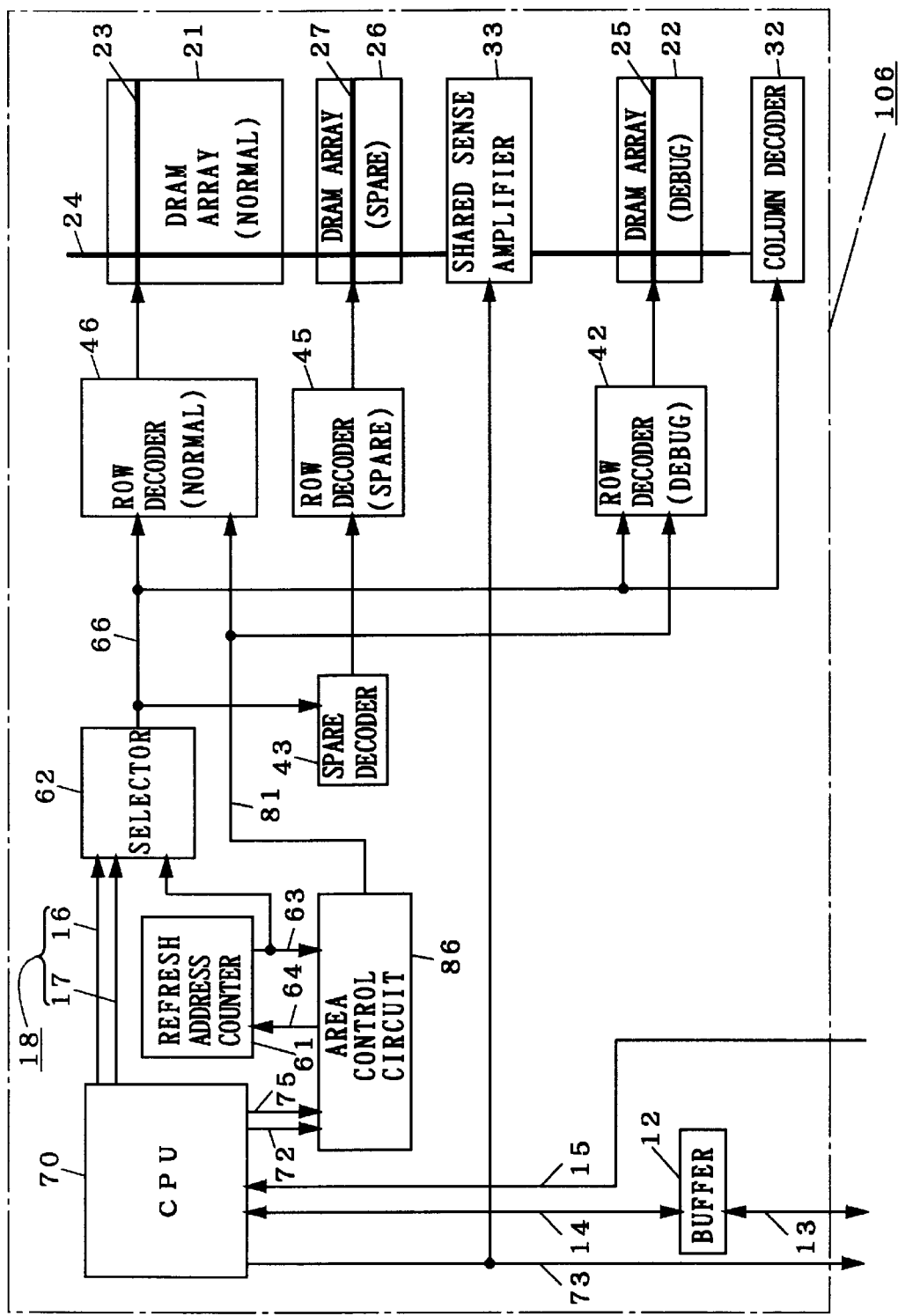
FIG. 13 is a block diagram showing an apparatus according to a sixth embodiment.
Figure 14:
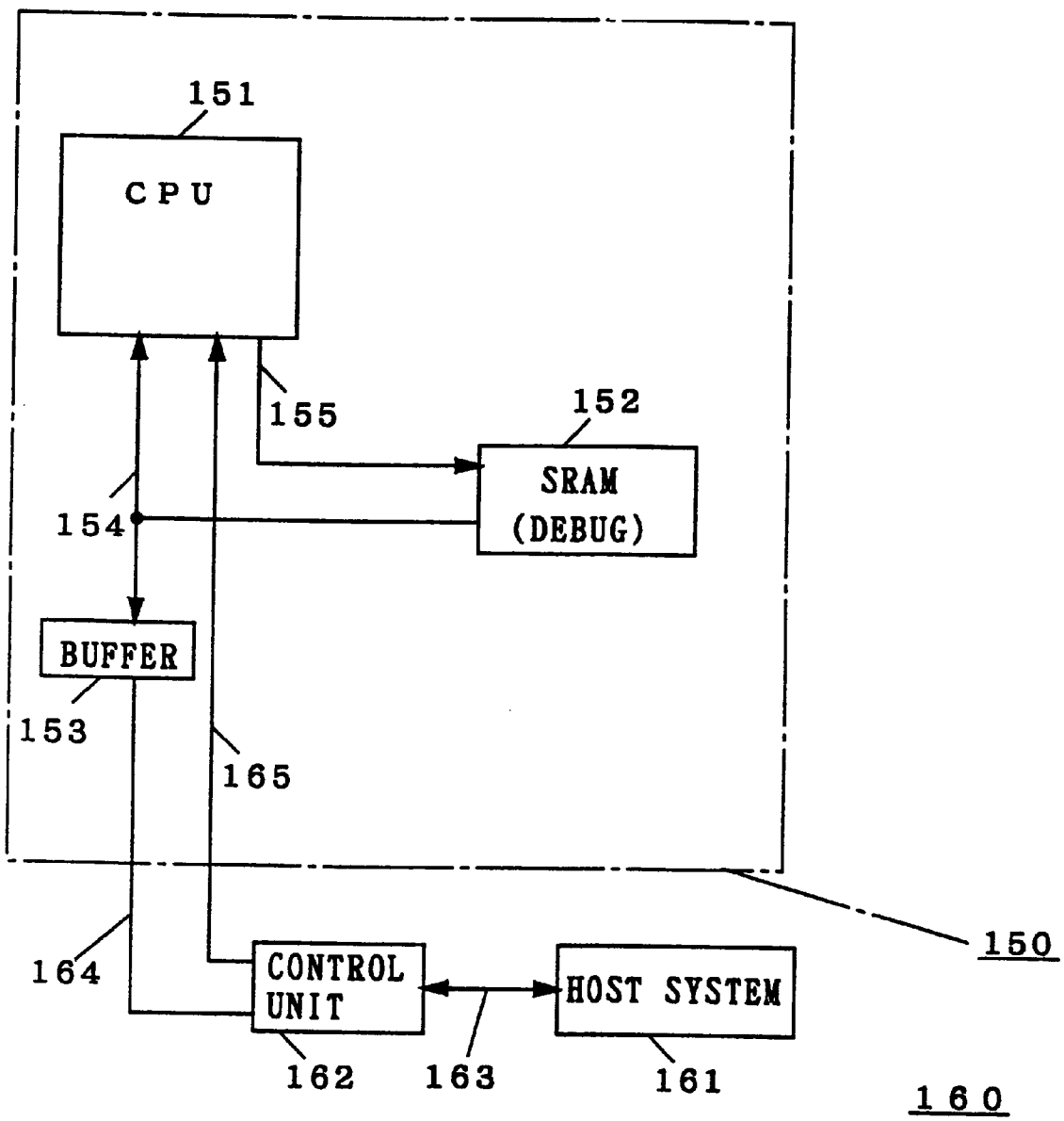
FIG. 14 is a block diagram showing an apparatus according to the prior art.

FIG. 13 is a block diagram showing a structure of a microprocessor having all characteristics of the microprocessors 102 to 105. Similarly to the microprocessor 102, a microprocessor 106 comprises a memory cell array 26 as a spare memory. Similarly to the microprocessor 103, furthermore, the microprocessor 106 comprises a refresh address counter 61, an area control circuit 86 having the function of the area control circuit 60, and a selector 62.

In addition, the area control circuit 86 also has the function of the area control circuit 80 of the microprocessor 104. Similarly to the microprocessor 105, a memory cell array 22 for debugging is connected to a shared sense amplifier 33 opposite to a memory cell array 21 (and a memory cell array 26).

Since the microprocessor 106 has the above-mentioned structure, all advantages of the microprocessors 102 to 105 can be obtained together.

While the invention has been described in detail, the foregoing description is in all aspects illustrative and not restrictive. It is understood that numerous other modifications and variations can be devised without departing from the scope of the invention.

We claim:

1. A microprocessor comprising, in a same semiconductor chip, a CPU and a semiconductor memory capable of being accessed by said CPU, wherein said CPU can selectively execute a normal processing mode and a debugging mode on the basis of a control signal sent from an outside source, said semiconductor memory includes a first memory cell array capable of being accessed when said CPU executes said normal processing mode, and a second memory cell array capable of being accessed when said CPU executes said debugging mode, a sense amplifier is shared by said first and second memory cell arrays, said semiconductor memory further includes a third memory cell array as a spare memory cell array for compensating for a defective cell of said first memory cell array, and said first to third memory cell arrays to be accessed are selected by a first control signal for selecting said first memory cell array to be accessed and a second control signal for selecting said second or third memory cell array to be accessed.

2. The microprocessor as defined in claim 1, further comprising:
   a first row decoder for driving a word line of said first memory cell array, and
   a second row decoder for driving word lines of said second and third memory cell arrays,
   wherein an address signal outputted from said CPU includes a first address signal capable of specifying all word lines of said first memory cell array, and a space control signal having different values between said normal processing mode and said debugging mode,
   said second row decoder including:
      a third row decoder for generating a second address signal specifying said word line of said second memory cell array on the basis of said first address signal and said space control signal;
      a comparing circuit for generating a third address selectively specifying said word line of said third memory cell array when said first address signal specifies said defective cell;
      a circuit for generating said first control signal on the basis of said second address signal and said third address signal;
      a fourth row decoder for selectively driving said word line of said second memory cell array on the basis of said second address signal;
      a fifth row decoder for selectively driving said word line of said third memory cell array on the basis of said third address signal; and
      a circuit for receiving said space control signal as said second control signal and for selectively executing either supply of said second address signal to said fourth row decoder or that of said third address signal to said fifth row decoder on the basis of said second control signal,
   said first row decoder receiving said first address signal and said first control signal, and determining, in response to said first control signal, whether or not said word line of said first memory cell array is selectively driven on the basis of said first address signal.

3. The microprocessor as defined in claim 1, wherein said semiconductor is a DRAM.

4. A microprocessor comprising, in a same semiconductor chip, a CPU and a semiconductor memory capable of being accessed by said CPU,
   wherein said CPU can selectively execute a normal processing mode and a debugging mode on the basis of a control signal sent from an outside source,
   said semiconductor memory includes a first memory cell array capable of being accessed when said CPU executes said normal processing mode, and a second memory cell array capable of being accessed when said CPU executes said debugging mode,
   a sense amplifier is shared by said first and second memory cell arrays, and
   wherein said semiconductor memory is a DRAM,
   said microprocessor further comprising a refresh circuit for refreshing said first and second memory cell arrays,
   said refresh circuit including a counter and a control circuit for controlling said counter,
   wherein said counter can generate, as a count value, an address continued over said first and second memory cell arrays and can return said count value to an initial value in response to a reset signal, and
   said control circuit sends said reset signal to said counter if said count value reaches a final address of said first memory cell array when said CPU executes said normal processing mode.

5. The microprocessor as defined in claim 4, wherein said CPU outputs a mode signal having different values between said normal processing mode and said debugging mode,
   said control circuit including:
      an address coincidence deciding circuit for comparing said count value of said counter with a value of said final address of said first memory cell and for outputting a decision signal having a predetermined value when said values are coincident with each other; and
      an AND circuit for calculating logical AND of said mode signal and said decision signal and for outputting said logical AND as said reset signal.

6. A microprocessor comprising, in a same semiconductor chip, a CPU and a semiconductor memory capable of being accessed by said CPU,
   wherein said CPU can selectively execute a normal processing mode and a debugging mode on the basis of a control signal sent from an outside source,
   said semiconductor memory includes a first memory cell array capable of being accessed when said CPU executes said normal processing mode, and a second memory cell array capable of being accessed when said CPU executes said debugging mode,
   a sense amplifier is shared by said first and second memory cell arrays, and
   wherein said CPU can selectively execute an operation mode capable of accessing an external memory provided on an outside of said microprocessor and an operation mode capable of accessing only said semiconductor memory,
   said microprocessor further comprising an area control circuit for controlling said first and second memory cell arrays so that access said first memory cell array is accessed in place of said second memory cell array on the basis of a control signal sent from said CPU when said CPU executes said operation mode capable of accessing said external memory and said debugging mode.

7. The microprocessor as defined in claim 6, further comprising:
   a first row decoder for driving a word line of said first memory cell array; and
   a second row decoder for driving a word line of said second memory cell array,
   wherein said CPU outputs an address signal capable of specifying all word lines of said first memory cell array, a first mode signal having normal and active values for said normal processing mode and said debugging mode respectively, and a second mode signal having active and normal values for said operation mode capable of accessing said external memory and said operation mode capable of accessing only said semiconductor memory respectively,
   said area control circuit including:
      a first logic circuit for outputting a signal to be active only when said values of said first and second mode signals are coincident with each other; and
      a second logic circuit for outputting a signal to be active only when said values of said first and second mode signals are active and normal respectively,
   said first row decoder selectively driving said word line of said first memory cell array on the basis of said address signal only when said signal outputted from said first logic circuit is active, and said second row decoder selectively driving said word line of said second memory cell array on the basis of said address signal only when said signal outputted from said second logic circuit is active.

* * * * *